United States Patent
Kendrick et al.

(10) Patent No.: US 10,622,665 B2
(45) Date of Patent: Apr. 14, 2020

(54) FORMATION METHOD FOR SODIUM ION CELL OR BATTERY

(71) Applicants: Sharp Kabushiki Kaisha, Osaka (JP); Faradion Limited, South Yorkshire (GB)

(72) Inventors: Emma Kendrick, Oxford (GB); Katherine Louise Smith, Oxford (GB); Joshua Charles Treacher, Oxford (GB)

(73) Assignees: Sharp Kabushiki Kaisha, Osaka (JP); Faradion Limited, Sheffield, South Yorkshire (GB)

( * ) Notice: Subject to any disclaimer, the term of this patent is extended or adjusted under 35 U.S.C. 154(b) by 190 days.

(21) Appl. No.: 15/764,126

(22) PCT Filed: Oct. 27, 2016

(86) PCT No.: PCT/JP2016/004735
§ 371 (c)(1),
(2) Date: Mar. 28, 2018

(87) PCT Pub. No.: WO2017/073066
PCT Pub. Date: May 4, 2017

(65) Prior Publication Data
US 2018/0219248 A1 Aug. 2, 2018

(30) Foreign Application Priority Data

Oct. 30, 2015 (GB) .................................. 1519235.4

(51) Int. Cl.
| | | |
|---|---|---|
| *H01M 10/04* | (2006.01) |
| *H01M 10/054* | (2010.01) |
| *H01M 4/04* | (2006.01) |
| *H01M 4/505* | (2010.01) |
| *H01M 4/525* | (2010.01) |
| *H01M 4/587* | (2010.01) |
| *H01M 4/131* | (2010.01) |
| *H01M 4/485* | (2010.01) |
| *H01M 4/02* | (2006.01) |

(52) U.S. Cl.
CPC ....... *H01M 10/049* (2013.01); *H01M 4/0447* (2013.01); *H01M 4/131* (2013.01); *H01M 4/485* (2013.01); *H01M 4/505* (2013.01); *H01M 4/525* (2013.01); *H01M 4/587* (2013.01); *H01M 10/054* (2013.01); *H01M 2004/027* (2013.01); *H01M 2004/028* (2013.01); *Y02W 30/84* (2015.05)

(58) Field of Classification Search
CPC ............ H01M 10/049; H01M 10/054; H01M 2004/027; H01M 2004/028; H01M 4/0447; H01M 4/131; H01M 4/485; H01M 4/505; H01M 4/525; H01M 4/587
See application file for complete search history.

(56) References Cited

U.S. PATENT DOCUMENTS

| | | | |
|---|---|---|---|
| 8,168,330 | B2 | 5/2012 | Tan et al. |
| 8,980,453 | B2 | 3/2015 | Scott et al. |
| 2007/0218361 | A1 | 9/2007 | Inoue et al. |
| 2015/0243983 | A1 | 8/2015 | Barker et al. |
| 2015/0357646 | A1 | 12/2015 | Lu et al. |
| 2017/0025865 | A1 | 1/2017 | Imazaki et al. |

FOREIGN PATENT DOCUMENTS

| | | |
|---|---|---|
| GB | 2503898 | 1/2014 |
| JP | 2015118845 | 6/2015 |
| WO | WO 2016/103649 A1 | 6/2016 |

OTHER PUBLICATIONS

Search Report for corresponding European Application No. 16859304.4 dated Sep. 17, 2018.
Kim, Kang et al, Enabling Sodium Batteries Using Lithium-Substituted Sodium Layered Transition Metal Oxide Cathodes, Adv. Energy Mater. 2011, 1, 333-336.
Komaba et al, Electrochemical Na Insertion and Solid Electrolyte Interphase for Hard-Carbon Electrodes and Application to Na-Ion Batteries, Adv. Funct. Mater. 2011, 21, 3859-3867.
International Search Report for corresponding International Application No. PCT/JP2016/004735 dated Nov. 24, 2016.

*Primary Examiner* — Carlos Barcena
(74) *Attorney, Agent, or Firm* — Renner, Otto, Boisselle & Sklar, LLP

(57) ABSTRACT

A method of operating a rechargeable sodium ion cell, wherein the cell comprises an anode material which is a disordered carbon and a nickel-containing sodium oxide cathode material comprises: in a formation charge phase, charging the cell to a first voltage at which sodium is irreversibly liberated from the cathode material; and in a subsequent charge-discharge cycle, charging the cell to a second voltage lower than the first voltage. The voltage to which the cell is charged in the formation charge phase may be selected such that the amount of sodium irreversibly liberated from the cathode material in the formation charge phase substantially equals the amount of sodium deposited in a surface electrolyte layer on the anode in the formation charge phase.

20 Claims, 3 Drawing Sheets

FORMATION METHOD FOR SODIUM ION CELL OR BATTERY

TECHNICAL FIELD

The field of the invention relates to an energy storage device, and more particularly to a sodium ion cell or battery. Further, the invention relates to a method for a formation charge of the device to optimise the energy density for long term cycling of the device.

BACKGROUND ART

Lithium ion cells are at present a large and growing market; they are very popular as electrochemical cells for portable electronic devices and lithium ion batteries are increasingly being applied to larger scale applications such as electric vehicles and stationary energy storage. They are a type of rechargeable cell in which lithium ions move from the negative electrode (anode) to the positive electrode (cathode) during discharge and back again when charging. During the charge or discharge, when the lithium ions are moving through the cell, a charge balancing current passes through an external circuit providing power.

However lithium is not a cheap metal to source and there is concern over its future availability and cost. Sodium-ion batteries are analogous in many ways to lithium ion batteries and research interest in sodium ion technology has increased over recent years. Although the sodium ions are larger and heavier than lithium ions, the same principle of the battery operation applies and the abundance and world wide access to sodium has led to predictions that sodium ion technology will provide a cheaper and more durable way to store energy in the future. This may be particularly applicable to large scale stationary energy applications.

Novel cathode and anode materials are being developed for sodium ion technology. The three main components of the cell are the cathode, anode and electrolyte. Generally, the negative electrode of a conventional lithium-ion cell is made from carbon. This is usually graphite for lithium ion cells; however for sodium ion technology the intercalation of the larger sodium ions into graphite is problematic, this is due to the size difference between the two ions, 95 pm for $Na^+$ versus 68 pm for $Li_+$. Typically a hard carbon (hard carbon is also known as amorphous carbon or disordered graphitic carbon and is distinguished from other carbons by having no long-range structure) is used instead, although other anode compositions are also under investigation. There are a wide range of possible cathode materials, and several examples in the prior art which describe the invention of novel layered oxide cathode materials for sodium ion batteries. For example, Komaba et al Adv. Funct. Mater. 2011, 21, 3859; Kim, Kang et al, Adv. Energy Mater. 2011, 1, 33-336, US2007/0218361, US20150243983A1.

During the first cycle of a rechargeable metal-ion cell different processes occur compared with subsequent cycles. On the anode side of the cell a layer known as the solid electrolyte interphase (SEI) is created. This SEI is formed at the negative electrode because some of the electrolyte components are not stable at the low voltages of this electrode during charging. The product of this decomposition forms a solid layer on the surface of the anode material. The chemical composition of this layer is very diverse and not thoroughly understood, and is dependent on the electrolyte used and surface properties of the anode. However, once this initial SEI layer has formed it can be impenetrable to the electrolyte molecules and electronically insulating and further significant build-up of the SEI is suppressed. Lithium ions however, can still pass through this layer to the active material. The formation of this SEI on the anode surface consumes some of the lithium which has originated from the cathode material. The lithium which forms the SEI layer is no longer available for shuttling between the cathode and anode and therefore the capacity of the cell is reduced on subsequent cycles compared with the first cycle. This is observed as a first cycle loss. The optimum procedure for the first cycle of the cell to establish a good quality SEI layer is dependent on the specific anode, cathode and electrolyte used and therefore is different for different cells.

U.S. Pat. No. 8,980,453 proposes overcharge during the formation charge of a cell but specifies that the cell is capacity limited by the negative electrode. This restricts the amount of sodium or lithium, and helps prevent plating of the metal onto the anode surface which can promote dendrite growth and lead to shorting of the cell. However, the requirement that the cell is capacity limited by the negative electrode means that the method of U.S. Pat. No. 8,980,453 is not widely applicable, and cannot be applied to many standard formats of cell as these have a cell capacity that is not limited by the cathode.

U.S. Pat. No. 8,168,330B2 proposes overcharge during the formation charge of a cell but is specific to lithium-ion cells. However, lithium-ion cells have different considerations to the sodium ion cells in an embodiment of the present invention and therefore the optimum procedures for sodium ion cells would be expected to be different.

US20150243983A1 describes an overcharge during the first charging cycle of a sodium ion battery. In this example the overcharging produces oxygen gas and the cell is degassed before continuing the cycling.

SUMMARY OF INVENTION

An embodiment of the present invention provides a method of operating a rechargeable sodium ion cell, wherein the cell comprises an anode material which is a disordered carbon and a cathode material $A_u\ M^1_v\ M^2_w\ M^3_x\ M^4_y\ M^5_z\ O_{2\pm c}$, wherein A comprises either sodium or a mixed alkali metal in which sodium is the major constituent; $M^1$ is nickel in an oxidation state between +2 and +4; $M^2$ comprises a metal in oxidation state +4 selected from one or more of manganese, titanium and zirconium; $M^3$ comprises a metal in oxidation state +2, selected from one or more of magnesium, calcium, copper, zinc and cobalt; $M^4$ comprises a metal in oxidation state +4, selected from one or more of titanium, manganese and zirconium; $M^5$ comprises a metal in oxidation state +3, selected from one or more of aluminium, iron, cobalt, molybdenum, chromium, vanadium, scandium and yttrium; U is in the range $0<U<1$; V is in the range $0.25<V<1$; W is in the range $0<W<0.75$; X is in the range $0\leq X<0.5$; Y is in the range $0\leq Y<0.5$; Z is in the range $0\leq Z<0.5$; $U+V+W+X+Y+Z\leq3$; and $c\geq0.0$. The method comprises: in a formation charge phase, charging the cell to a first voltage at which sodium is irreversibly liberated from the cathode material; and in a subsequent charge-discharge cycle, charging the cell to a second voltage lower than the first voltage.

DESCRIPTION OF EMBODIMENTS

The sodium ion cell formation method the subject of this one embodiment of the invention is based upon a layered sodium layered oxide material of the formula $A_u M^1_v M^2_w M^3_x M^4_Y M^5_z O_{2\pm c}$, wherein A comprises either sodium or a mixed alkali metal in which sodium is the major constituent;

$M^1$ is nickel in an oxidation state between +2 and +4;

$M^2$ comprises a metal in oxidation state +4 selected from one or more of manganese, titanium and zirconium;

$M^3$ comprises a metal in oxidation state +2, selected from one or more of magnesium, calcium, copper, zinc and cobalt;

$M^4$ comprises a metal in oxidation state +4, selected from one or more of titanium, manganese and zirconium; $M^5$ comprises a metal in oxidation state +3, selected from one or more of aluminium, iron, cobalt, molybdenum, chromium, vanadium, scandium and yttrium;

U is in the range 0<U<1
V is in the range 0.25<V<1;
W is in the range 0<W<0.75;
X is in the range 0≤X<0.5;
Y is in the range 0≤Y<0.5;
Z is in the range 0≤Z<0.5;
U+V+W+X+Y+Z≤3; and
c≥0.0.

The anode material is based upon a hard carbon type material, wherein the carbon is in a disordered atomic arrangement.

Figure 1:
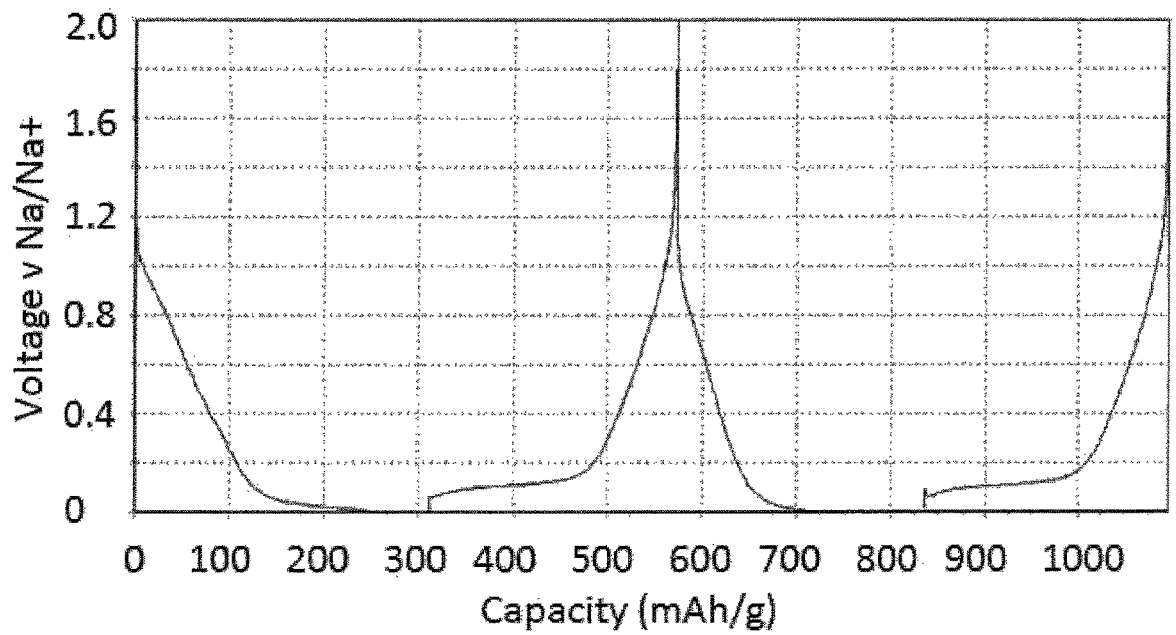
FIG. 1 is voltage profile, against cumulative specific capacity vs V vs Na for a hard carbon with a sodium metal anode.

FIG. 1 shows the half-cell data for the hard carbon anode material used in an embodiment of the present invention. The first cycle loss at the anode due to the SEI formation is higher than in lithium cells with graphite anodes, typically >16%, as shown.

Figure 2:
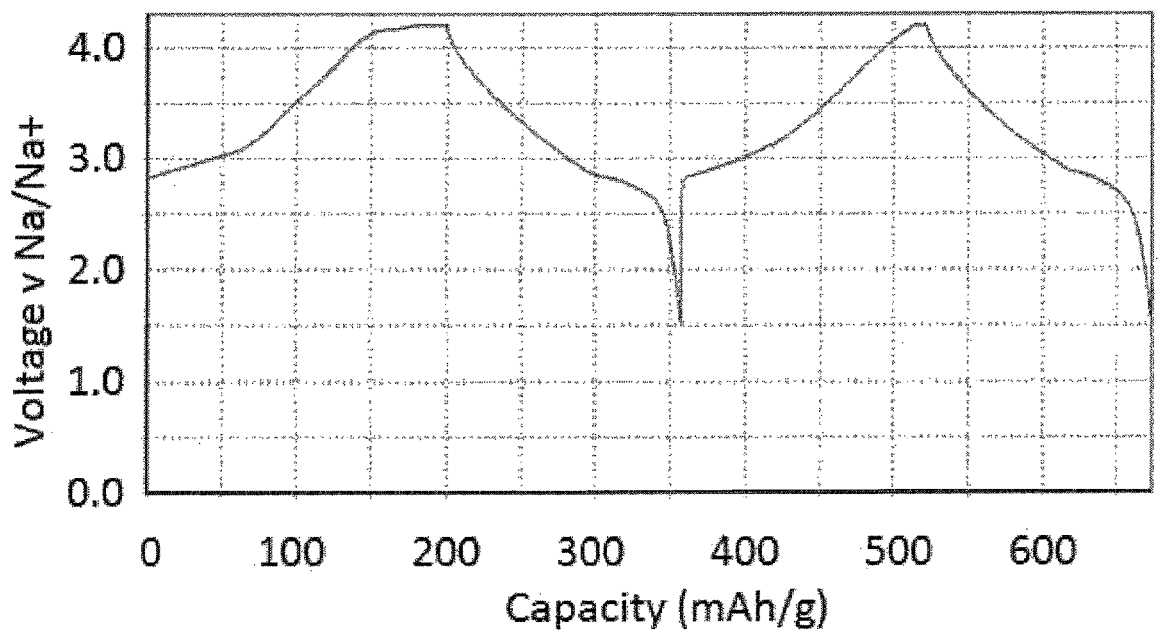
FIG. 2 is voltage profile against cumulative specific capacity for a sodium nickel based layered oxide material vs a sodium metal anode, charged to 4.2V vs Na.

FIG. 2 shows half-cell data of the cathode material taken to 4.2V versus a sodium metal counter-electrode. This shows a first cycle loss of 21%. The first cycle loss of the cathode is dependent on the upper voltage limit to which the material is taken.

Figure 3:
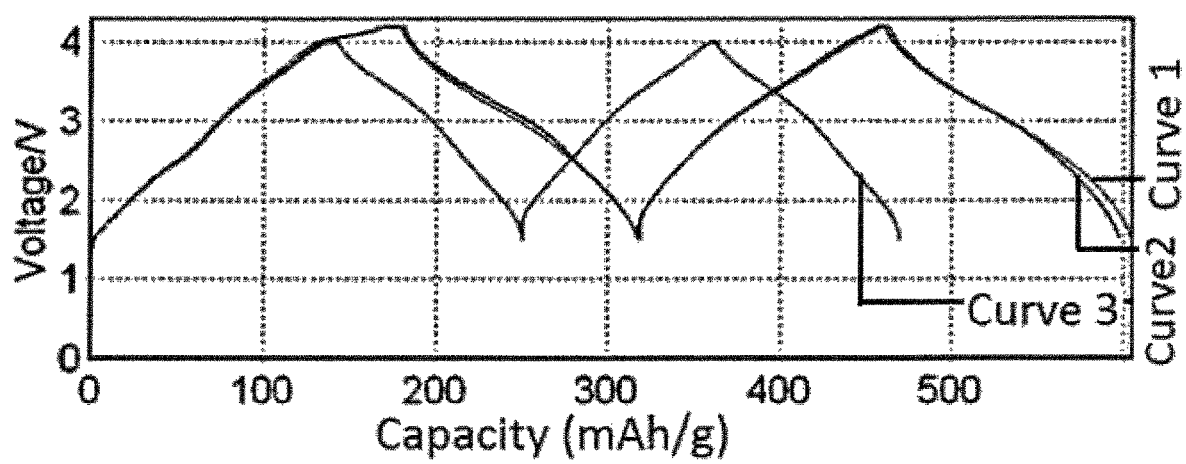
FIG. 3 is the cell voltage profile against cumulative specific capacity for a nickel based layered oxide cathode material versus hard carbon anode material) of the nickel based sodium layered oxide cathode with a hard carbon anode for the first two cycles, the cells are taken either to 4.0V or to 4.2V upper voltage.

FIG. 3 shows the voltage profile for full cells (layered oxide cathode material versus hard carbon anode material) of the nickel based sodium layered oxide cathode with a hard carbon anode for the first two cycles. The data from the numbered curves in the FIG. 3 corresponds with the cycling data given in FIG. 4. The cell in curve 1 is taken to an upper voltage limit of 4.2V for the first two cycles as a formation charge step, and then subsequently cycled at 4.0V. The cell in curve 2 is taken to an upper voltage limit of 4.2V for the first two cycles as a formation charge step and then continues to be cycled to 4.2V. The cell in curve 3 is taken to an upper voltage limit of 4.0V for the first two cycles as a formation charge step and then continues to be cycled to 4.0V. The anomalous capacity observed as an irreversible capacity for the cathode is discussed in US20150243983A1. The first cycle losses in the full cell as shown do not greatly exceed those observed in the half cells for the cathode or anode versus sodium metal and therefore the first cycle losses due to the cathode and the anode are not additive in the full cell, i.e. the first cycle loss of the full cell is not equal to the sum first cycle loss of the cathode and the first cycle loss of the anode.

The inventors have realised that sodium that is permanently lost from the cathode during the first cycle loss on the positive side of the cell is available for the SEI formation on the anode on the negative side of the cell. This allows the upper voltage of the full cell during the formation cycle(s) to be chosen so that the formation cycle(s) loss of sodium on the positive side of the cell balances the formation cycle(s) loss of sodium on the anode side due to the SEI formation. This allows the reversible capacities of the anode and the cathode (that is, the capacities of the anode and cathode that remain after the losses in the formation cycle(s)) to be accurately balanced for the subsequent cycling voltage window, so that the reversible capacities of the anode and the cathode are, as far as can be ascertained, the same as one another. Therefore there is no excess material in the system, and the cell energy density can be maximised. This is a surprising benefit of the irreversible capacity of the layered oxide cathode material in a sodium ion cell when taken to voltages for the formation charge above the typical cycling voltage window for the cell. It is specifically useful in coping with the large first cycle loss experienced when using hard carbon as an anode material and avoids the need to supply an excess of the cathode material to allow for the sodium consumed in the formation of the SEI layer on the hard carbon anode. In the examples shown the cells were taken to the higher voltage for the first two cycles which allows the first cycle loss of the overall cell to be measured.

Figure 4:
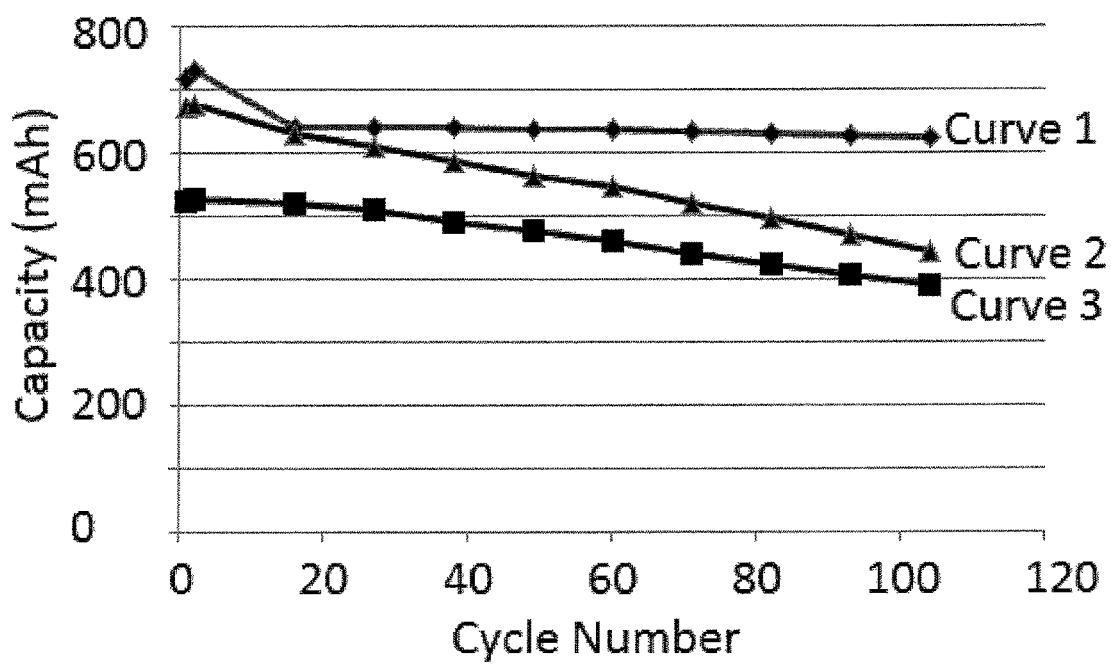
FIG. 4 shows a plot of the absolute capacity in mAh as a function of cycle for cells operated under different voltage limits during formation charge and cycling. Curve 1 shows the cycling of the cell with an initial two cycle formation charge to 4.2V and subsequent cycling to 4.0V. Curve 2 shows the cycling performance of the cells with all cycles taken to 4.2V. Curve 3 shows the cycling performance with all the cycles taken to 4.0V.

FIG. 4 shows a plot of the absolute capacity in mAh as a function of cycle for cells operated under different voltage limits during formation charge and cycling. Curve 1 shows the cycling of the cell with an initial two cycle formation charge to 4.2V and subsequent cycling to 4.0V. Curve 2 shows the cycling performance of the cells with all cycles taken to 4.2V. Curve 3 shows the cycling performance with all the cycles taken to 4.0V.

Figure 5:
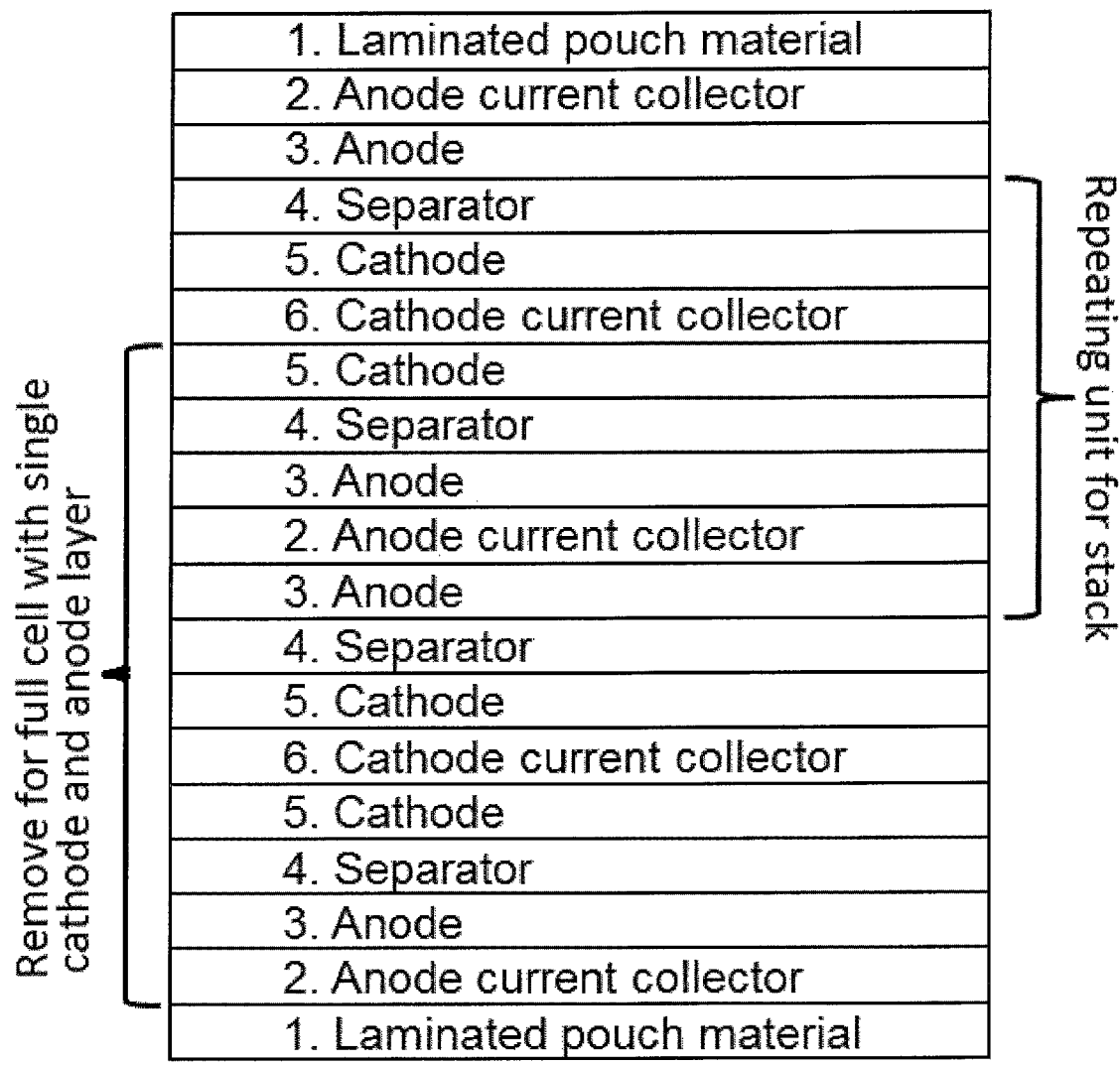
FIG. 5 shows the basic structure of an example of a sodium ion cell stack.

FIG. 5 shows the basic structure of an example of a sodium ion cell

Example 1

FIG. 4 shows the cycling data for three cells subjected to different cycling conditions. The electrode coatings were all made as described below. Three identical cells were made to test the different cycling conditions. The cells contained eight double sided cathode coatings and also 7 double sided and two single sided anode coatings. The cathode coatings were formed by mixing the nickel based sodium layered oxide material with small quantities of a carbon black conductive additive and a PVDF/CTFE copolymer binder with NMP solvent. This slurry was cast onto carbon coated aluminium and dried before the slurry was also cast on the opposite side. These electrodes were then vacuum dried, cut and calendered (rolled) before use in the cells.

The conductive carbon additive was C65 from TimCal. The ratio of the components was 87% active material, 6% binder and 5% conductive additive. The anode coatings were formed by mixing a hard carbon with NMP, PvDF binder and a carbon black conductive additive, and casting this slurry onto carbon coated aluminium. In this case the hard carbon was Carbotron PS(F) from Kureha and the conductive carbon additive was C45 from TimCal. The ratio of the components was 90% active material, 5% binder and 5% conductive additive. This coating was dried and the casting repeated on the opposite side, the coatings were then cut and vacuum dried before being assembled into cells.

In this example the cells were constituted by cells stacks formed by z-folding a polypropylene separator material between the layers. The cathode layers were welded together ultrasonically with tabbing material, the anode layers were similarly welded together ultrasonically with tabbing material. This stack was placed in a formed pouch of laminated aluminium. An electrolyte consisting of a 1M solution of $NaPF_6$ in an organic solvent mix of EC:PC:DEC (ethylene carbonate, propylene carbonate and diethyl carbonate) was added to the cell which was subsequently sealed. No degas step was carried out on the cells and no gas formation was observed in the cells. The cells were cycled under constant current constant voltage conditions where the cell is cycled at a given current density until the set voltage limit is reached and then held at that voltage until the current drops to one tenth of the current in the previous step. Curve 1 of FIG. 4 shows the cycling of the cell with an initial two cycle formation charge to 4.2V and subsequent cycling to 4.0V. Curve 2 of FIG. 4 shows the cycling performance of the cells with all cycles taken to 4.2V. Curve 3 of FIG. 4 shows the cycling performance with all the cycles taken to 4.0V. It is therefore demonstrated that there is a clear improvement in the performance of the cell when the cell is taken to an initial formation charge of 4.2V and then subsequently cycled up to 4.0V. Therefore in addition to the balancing of the first cycle loss on the anode and cathode sides of the cell, there is an additional surprising benefit in the longevity of the cells. By initially charging to 4.2V and then subsequently cycling at 4.0V, the fade rate of the capacity of the cell is reduced and it is extrapolated that this cell will exceed 700 cycles before the capacity drops below 80% of the initial capacity after the formation charge.

Therefore in an embodiment of the present invention the cell may be taken initially to an upper voltage of greater than 4.0V and preferably less than around 4.5V for a formation charge step and subsequently (that is, after the formation charge phase is complete) cycled to an upper voltage limit less than the initial formation charge upper voltage limit. If the voltage exceeds around 4.5V it is found that the cathode becomes less stable and doesn't cycle so well, and there is also a risk that the cell electrolyte may start to oxidise although the voltage at which this occurs depends on the specific electrolyte used. More preferably, the cell may be taken initially to an upper voltage of between 4.1V and 4.3V for a formation charge step and subsequently cycled to an upper voltage limit of between 3.9V and 4.1V. This achieves a balance of the first cycle loss on the cathode and the anode and a low fade rate of the cell performance during subsequent cycling.

Example 2

More preferably the cathode material comprises a compound of the formula
$A_{1-\delta}Ni_vMn_wMg_xTi_yO_2$ wherein:
A is sodium Mn, Mg and Ti correspond to $M^2$, $M^3$ and $M^4$ in the general formula given above, the $M^5$ constituent is not present (Z=0), Ni is nickel in oxidation state +2
$0 \le \delta \le 0.1$
V is in the range $0.3 < V < 0.45$;
W is in the range $0 < W \le 0.5$;
X is in the range $0 \le X < 0.3$;
Y is in the range $0 \le Y < 0.4$;
Z=0;
and V+W+X+Y+Z=1.

The same anode, electrolyte and cell design are as described in the first example. The cell may be taken initially to an upper voltage of greater than 4.0V and less than 4.5V for a formation charge step and subsequently cycled to an upper voltage limit less than the formation charge upper voltage limit. More preferably, the cell may be taken initially to an upper voltage of between 4.1V and 4.3V for a formation charge step and subsequently cycled to an upper voltage limit of between 3.9V and 4.1V.

Example 3

In a third example of the present invention cells were fabricated as described in the first example. Prior to cycling the cells were subjected to an aging procedure to improve the lifetime of the cells. The aging procedure requires holding the cell above room temperature for a given period of time and may include at least one the following steps:
Holding the cell above 30° C. for a time in excess of one hour;
Holding the cell above 50° C. for a time in excess of one hour;
Holding the cell above 70° C. for a time in excess of one hour;
Holding the cell above 30° C. for a time greater than one day and less than 30 days;
Holding the cell above 50° C. for a time greater than one day and less than 30 days;
Holding the cell above 70° C. for a time greater than one day and less than 30 days;

During the period at which the cell is held above room temperature the cell may be held at a voltage that is greater than the open circuit voltage of the cell but low enough not to cause damage to the cell, for example, less than the voltage at which breakdown of the electrolyte begins to occur. This partially charges the cell, and the partially-charged cell is then held above room temperature as described above to be "aged".

More preferably, during the period at which the cell is held above room temperature the cell may be held at a voltage greater than 3V and less than 4.5V.

After the aging process is completed the cell may be taken initially to an upper voltage of greater than 4.0V and preferably less than 4.5V for a formation charge step and subsequently cycled to an upper voltage limit less than the formation charge upper voltage limit. More preferably, the cell may be taken initially to an upper voltage of between 4.1V and 4.3V for a formation charge step and subsequently cycled to an upper voltage limit of between 3.9V and 4.1V.

Example 4

In a fourth example of the present invention, the electrodes for the cells may be fabricated as described in the first example. In place of the electrolyte described in the first example, the electrolyte for the cells may contain any appropriate sodium ion salt to provide ionic conductivity in the cell. The electrolyte may contain any suitable solvent in which the chosen salt can be dissolved. The electrolyte salt may be NaClO$_4$, NaPF$_6$, NaAsF$_6$, NaBF$_4$, or NaTFSI (Sodium bis(trifluoromethanesulphonate) imide). The electrolyte solvent may be any combination containing propylene carbonate, ethylene carbonate, dimethyl carbonate, diethyl carbonate, ethyl methyl carbonate or dimethoxyethane. In addition to the main electrolyte components the electrolyte may also contain additives, for example fluoroethylene carbonate, vinylene carbonate, organonitrates, organophosphates, organosulfates or isocyanates. The cells may be aged as described in the third example. The cell may be taken initially to an upper voltage of greater than 4.0V and preferably less than 4.5V for a formation charge step and subsequently cycled to an upper voltage limit less than the formation charge upper voltage limit. More preferably, the cell may be taken initially to an upper voltage of between 4.1V and 4.3V for a formation charge step and subsequently cycled to an upper voltage limit of between 3.9V and 4.1V.

FIG. 5 shows the basic structure of an example of a sodium ion cell stack to which an embodiment of the present invention may be applied. The layers labelled "remove for full cell with single cathode and anode layer" may be removed to create a simple full cell with a single coating each of the cathode and anode material. Alternatively the layers labelled "Repeating unit for stack" including additional double sided coated cathode electrode, separator and double sided anode electrode may be repeated multiple times to build up a higher capacity cell.

Although an embodiment of the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of an embodiment of the invention may have been described above with respect to only one or more of several embodiments, such feature may be combined with one or more other features of the other embodiments, as may be desired and advantageous for any given or particular application.

INDUSTRIAL APPLICABILITY

An embodiment of the invention relates to an improvement in sodium ion cell/battery technology and may be applied for use in many different applications such as energy storage devices, rechargeable batteries and electrochemical devices. Advantageously the cells according to an embodiment of the invention maximise the utilisation of the active materials in the electrodes, therefore maximising the energy density of the cells.

OVERVIEW

An embodiment of the present invention provides a method of operating a rechargeable sodium ion cell, wherein the cell comprises an anode material which is a disordered carbon and a cathode material $A_u M^1_v M^2_w M^3_x M^4_y M^5_z O_{2\pm c}$, wherein A comprises either sodium or a mixed alkali metal in which sodium is the major constituent; $M^1$ is nickel in an oxidation state between +2 and +4; $M^2$ comprises a metal in oxidation state +4 selected from one or more of manganese, titanium and zirconium; $M^3$ compress metal in oxidation state +2, selected from one or more of magnesium, calcium, copper, zinc and cobalt; $M^4$ comprises a metal in oxidation state +4, selected from one or more of titanium, manganese and zirconium; $M^5$ comprises a metal in oxidation state +3, selected from one or more of aluminium, iron, cobalt, molybdenum, chromium, vanadium, scandium and yttrium; U is in the range $0<U<1$; V is in the range $0.25<V<1$; W is in the range $0<W<0.75$; X is in the range $0\leq X<0.5$; Y is in the range $0\leq Y<0.5$; Z is in the range $0\leq Z<0.5$; $U+V+W+X+Y+Z\leq 3$; and $c\geq 0.0$. The method comprises: in a formation charge phase, charging the cell to a first voltage at which sodium is irreversibly liberated from the cathode material; and in a subsequent charge-discharge cycle, charging the cell to a second voltage lower than the first voltage.

An embodiment of the invention may be applied to a cell that contains single anode and a single cathode (forming a cell unit), or it may be applied to a cell stack that consist of multiple cell units. It may also be applied to a cell unit or cell stack that is incorporated into a battery—as is known, multiple cell units or multiple cell stacks may be used in conjunction to form a battery.

An embodiment of the present invention describes an improved formation procedure for a nickel based sodium layered oxide cathode, and a hard carbon anode sodium ion cell. It has been found that the procedure of an embodiment of the invention may extend the cycle life to greater than 500 cycles to 80% of the initial capacity.

This one embodiment of the invention describes the formation method in a full cell configuration balancing the cathode sodium loss in the formation cycle(s) with the anode SEI formation and with the voltage upon formation charge. In addition there is no oxygen gas produced in an embodiment of the present invention, therefore the degas step of US20150243983A1 is not necessary. An embodiment of the present invention may be applied to a cell in which the mass ratio of cathode active material to anode active material is chosen to provide control over the voltages applied to the anode and cathode during the formation charge phase as described in co-pending UK patent application No. 15xxxxx.x "Method of passive voltage control in a sodium-ion battery", Marks & Clerk Reference PX214706GB, Sharp reference 15R01071/GB (15019), filed concurrently herewith, the contents of which are hereby incorporated by reference.

In a lithium ion cell the first cycle loss is assumed to be due to the formation of the surface electrolyte interface (SEI) at the graphite anode surface and is typically <15%. For the hard carbon used as the anode material in an embodiment of the present sodium-ion battery invention, the first cycle loss at the anode due is higher than in lithium cells with graphite anodes, and is typically >16%. In a full sodium ion cell this capacity loss on the anode also consequently infers a sodium loss from the cathode some sodium liberated from the cathode when the cell is charged is incorporated in the SEI, and so does not return to the cathode upon discharge.

However in this one embodiment of the invention the nickel based layered oxide cathode material used in the present an embodiment of invention also shows a capacity loss between the 1st and 2nd cycle when cycled above 4.0V vs Na, for example shows a first cycle loss of 21%. For example, FIG. 2 is a voltage profile for a sodium nickel based layered oxide material vs a sodium metal anode, and this shows an irreversible capacity loss over the first charging and discharging cycle—indicating an irreversible loss of sodium from the cathode even though no sodium ions were lost at the anode through incorporation into an SEI. The inventors have realised that this capacity loss in the cathode in the first cycle is dependent on the upper voltage limit to which the material is taken, so that the capacity loss in the cathode can be controlled to compensate for the capacity loss in the anode in the first cycle. The irreversible capacity losses observed in the cathode are extremely sensitive to the upper voltage observed by the cathode. However the long term cycling of the sodium ion battery is determined by the stability of the cathode and the voltages it observes. This one embodiment of the invention shows that during the formation charges the loss of sodium due to the SEI layer on the anode can be compensated by the losses observed on the cathode, and this can be controlled by cell voltage, and possibly temperature, during the formation charge phase. (The inventors have observed that at higher temperatures during the formation charge phase there may be a higher degree of irreversible sodium loss from the cathode. Therefore it is possible that at a higher temperature the cell need only be charged to a lower voltage—for example, at a temperature of 70° C. charging to 4.0V vs Na may cause the same degree of sodium loss from the cathode as charging to 4.2V at room temperature.) However during long term cycling the voltages must be adjusted and with lower cell cycling voltages the capacity fade rate is much reduced.

The first voltage may be selected such that the amount of sodium irreversibly liberated from the cathode material in the formation charge phase substantially equals the amount of sodium deposited in a surface electrolyte layer on the anode in the formation charge phase. The voltage to which the cell is charged in the formation charging phase may depend on the temperature since, as noted, it is observed that there is a greater degree of first cycle loss at higher temperatures when taken to the same voltage limits.

The first voltage may be greater than 4.0V.
The first voltage may be less than 4.5V.
The first voltage may be between 4.1V and 4.3V.
The second voltage may be less than 4.0V.
The second voltage may be between 3.9V and 4.1V.

The formation charge phase may comprise charging the cell to the first voltage in at least two charge cycles. Alternatively, where the formation charge phase comprises charging the cell in at least two charge cycles it is not necessary to charge the cell to exactly the same voltage in each charge cycle of the formation charge phase, provided that the cell is charged to a voltage that is sufficient to cause irreversible liberation of sodium from the cathode material in each cycle of the formation charge phase.

The method may comprise before the formation charge phase, holding the temperature of the cell above room temperature. "Room temperature" as used herein is defined as a temperature in between 20 and 30° C., preferably between 20 and 25° C. This acts as an "aging procedure" to improve the lifetime of the cell.

Holding the temperature of the cell above room temperature may comprise holding the temperature of the cell above 30° C. for at least one hour.

Holding the temperature of the cell above room temperature may comprise holding the temperature of the cell above 50° C. for at least one hour.

Holding the temperature of the cell above room temperature may comprise holding the temperature of the cell above 70° C. for at least one hour.

Holding the temperature of the cell above room temperature may comprise holding the temperature of the cell above 50° C. for at least one day.

Holding the temperature of the cell above room temperature may comprise holding the temperature of the cell above 50° C. for less than 30 days.

Holding the temperature of the cell above room temperature may comprise holding the temperature of the cell above 70° C. for at least one day.

Holding the temperature of the cell above room temperature may comprise holding the temperature of the cell above 70° C. for less than 30 days.

The method may comprise applying a non-zero voltage across the cell while holding the temperature of the cell above room temperature.

The non-zero voltage may be greater than the open circuit voltage of the cell.

The non-zero voltage may be greater than 3V.
The non-zero voltage may be less than 4.5V.

A second aspect of the invention provides a rechargeable sodium ion cell obtained by a method of the first aspect.

To the accomplishment of the foregoing and related ends, an embodiment of the invention, then, comprises the features hereinafter fully described and particularly pointed out in the claims. The foregoing description and the annexed drawings set forth in detail certain illustrative embodiments of the invention. These embodiments are indicative, however, of but a few of the various ways in which the principles of the invention may be employed. Other objects, advantages and novel features of an embodiment of the invention will become apparent from the foregoing detailed description of an embodiment of the invention when considered in conjunction with the drawings.

This Nonprovisional application claims priority under 35 U.S.C. § 119 on Patent Application No. 1519235.4 filed in Great Britain on Oct. 30, 2015, the entire contents of which are hereby incorporated by reference.

The invention claimed is:

1. A method of operating a rechargeable sodium ion cell, wherein the cell comprises an anode material which is a disordered carbon and a cathode material $A_u M^1_v M^2_w M^3_x M^4_y M^5_z O_{2\pm c}$, wherein A comprises either sodium or a mixed alkali metal in which sodium is the major constituent;
$M^1$ is nickel in an oxidation state between +2 and +4;
$M^2$ comprises a metal in oxidation state +4 selected from one or more of manganese, titanium and zirconium;
$M^3$ comprises a metal in oxidation state +2, selected from one or more of magnesium, calcium, copper, zinc and cobalt;
$M^4$ comprises a metal in oxidation state +4, selected from one or more of titanium, manganese and zirconium;
$M^5$ comprises a metal in oxidation state +3, selected from one or more of aluminium, iron, cobalt, molybdenum, chromium, vanadium, scandium and yttrium;
U is in the range $0<U<1$;
V is in the range $0.25<V<1$;
W is in the range $0<W<0.75$;
X is in the range $0 \leq X<0.5$;
Y is in the range $0 \leq Y<0.5$;
Z is in the range $0 \leq Z<0.5$;
$U+V+W+X+Y+Z \leq 3$; and
$c \geq 0.0$;

wherein the method comprises:
in a formation charge phase, charging the cell to a first voltage at which sodium is irreversibly liberated from the cathode material; and
in a subsequent charge-discharge cycle, charging the cell to a second voltage lower than the first voltage.

2. A method as claimed in claim 1 wherein the first voltage is selected such that the amount of sodium irreversibly liberated from the cathode material in the formation charge phase substantially equals the amount of sodium deposited in a surface electrolyte layer on the anode in the formation charge phase.

3. A method as claimed in claim 1 or a wherein the first voltage is greater than 4.0V.

4. A method as claimed in claim 1 wherein the first voltage is less than 4.5V.

5. A method as claimed in claim 1 wherein the first voltage is between 4.1V and 4.3V.

6. A method as claimed in claim 1 wherein the second voltage is less than 4.0V.

7. A method as claimed in claim 1 wherein the second voltage is between 3.9V and 4.1V.

8. A method as claimed in claim 1 wherein the formation charge phase comprises charging the cell to the first voltage in at least two charge cycles.

9. A method as claimed in claim 1, and comprising, before the formation charge phase, holding the temperature of the cell above room temperature.

10. A method as claimed in claim 9 wherein holding the temperature of the cell above room temperature comprises holding the temperature of the cell above 30° C. for at least one hour.

11. A method as claimed in claim 9 wherein holding the temperature of the cell above room temperature comprises holding the temperature of the cell above 50° C. for at least one hour.

12. A method as claimed in claim 9 wherein holding the temperature of the cell above room temperature comprises holding the temperature of the cell above 70° C. for at least one hour.

13. A method as claimed in claim 9 wherein holding the temperature of the cell above room temperature comprises holding the temperature of the cell above 50° C. for at least one day.

14. A method as claimed in claim 9 wherein holding the temperature of the cell above room temperature comprises holding the temperature of the cell above 50° C. for less than 30 days.

15. A method as claimed in claim 9 wherein holding the temperature of the cell above room temperature comprises holding the temperature of the cell above 70° C. for at least one day.

16. A method as claimed in claim 9 wherein holding the temperature of the cell above room temperature comprises holding the temperature of the cell above 70° C. for less than 30 days.

17. A method as claimed in claim 9, and comprising applying a non-zero voltage across the cell while holding the temperature of the cell above room temperature.

18. A method as claimed in claim 17 wherein the non-zero voltage is greater than the open circuit voltage of the cell.

19. A method as claimed in claim 17 wherein the non-zero voltage is greater than 3V.

20. A method as claimed in claim 17 wherein the non-zero voltage is less than 4.5V.

* * * * *